(12) United States Patent
Izumi et al.

(10) Patent No.: US 12,135,299 B2
(45) Date of Patent: Nov. 5, 2024

(54) X-RAY FLUORESCENCE ANALYZER

(71) Applicant: Shimadzu Corporation, Kyoto (JP)

(72) Inventors: Takuro Izumi, Kyoto (JP); Tetsuya Yoneda, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 119 days.

(21) Appl. No.: 17/794,855

(22) PCT Filed: Oct. 15, 2020

(86) PCT No.: PCT/JP2020/038875
§ 371 (c)(1),
(2) Date: Jul. 22, 2022

(87) PCT Pub. No.: WO2021/152928
PCT Pub. Date: Aug. 5, 2021

(65) Prior Publication Data
US 2023/0057233 A1    Feb. 23, 2023

(30) Foreign Application Priority Data

Jan. 27, 2020   (JP) .................................. 2020-010907

(51) Int. Cl.
*G01N 23/20008*    (2018.01)
*G01N 23/207*    (2018.01)
(Continued)

(52) U.S. Cl.
CPC ... *G01N 23/20008* (2013.01); *G01N 23/2076* (2013.01); *G01N 23/2209* (2018.02);
(Continued)

(58) Field of Classification Search
None
See application file for complete search history.

(56) References Cited

U.S. PATENT DOCUMENTS

| 9,410,906 | B2 * | 8/2016 | Hirose | H05G 1/025 |
| 9,857,483 | B2 * | 1/2018 | Yasui | G01T 1/244 |

(Continued)

FOREIGN PATENT DOCUMENTS

| JP | 2003-107021 A | 4/2003 |
| JP | 2007-135708 A | 6/2007 |

(Continued)

OTHER PUBLICATIONS

Written Opinion of the International Search Authority for corresponding PCT application No. PCT/JP2020/038875, dated Dec. 22, 2020, submitted with a machine translation.

(Continued)

*Primary Examiner* — Thomas R Artman
(74) *Attorney, Agent, or Firm* — Muir Patent Law, PLLC (57) ABSTRACT

An X-ray fluorescence analyzer is provided inside an analysis chamber covered with a housing with: an X-ray tube; an analyzing crystal for spectrally dispersing X-ray fluorescence emitted from a sample; an X-ray detector for detecting the X-ray fluorescence spectrally dispersed by the analyzing crystal; a warm air generator for generating warm air to maintain a temperature of the analyzing crystal at a target temperature; and a Peltier element for cooling the X-ray detector.

3 Claims, 3 Drawing Sheets

(51) Int. Cl.
*G01N 23/2209* (2018.01)
*G01N 23/223* (2006.01)

(52) U.S. Cl.
CPC ..... *G01N 23/223* (2013.01); *G01N 2223/076* (2013.01); *G01N 2223/079* (2013.01); *G01N 2223/1016* (2013.01); *G01N 2223/3103* (2013.01); *G01N 2223/3106* (2013.01)

(56) References Cited

U.S. PATENT DOCUMENTS

| | | | | |
|---|---|---|---|---|
| 10,278,273 | B2* | 4/2019 | Marui | H05G 1/025 |
| 2014/0294145 | A1* | 10/2014 | Hirose | H05G 1/025 378/45 |
| 2016/0313455 | A1 | 10/2016 | Yasui et al. | |
| 2018/0007768 | A1* | 1/2018 | Marui | H05G 1/025 |
| 2023/0057233 | A1* | 2/2023 | Izumi | G01N 23/2076 |

FOREIGN PATENT DOCUMENTS

| | | |
|---|---|---|
| JP | 2010175404 A | 8/2010 |
| JP | 2013160614 A | 8/2013 |
| JP | 2015081783 A | 4/2015 |
| JP | 2015125043 A | 7/2015 |
| JP | 2016-206191 A | 12/2016 |
| JP | 2017-003460 A | 1/2017 |

OTHER PUBLICATIONS

Notice of Reasons for Refusal for Japanese patent application No. 2021-574456, dated Feb. 14, 2023.
Office Action dated Aug. 31, 2024 for corresponding application No. CN 202080094677.X.

* cited by examiner

X-RAY FLUORESCENCE ANALYZER

TECHNICAL FIELD

The present disclosure relates to a wavelength dispersive X-ray fluorescence analyzer.

BACKGROUND ART

An X-ray fluorescence analyzer is a device for analyzing elements contained in a sample by detecting the X-ray fluorescence (characteristic X-rays) emitted from the sample when the sample is irradiated with excitation X-rays (radiation) or an excitation electron beam. The X-ray fluorescence analyzer is classified into an energy dispersion type and a wavelength dispersion type depending on how the energy (wavelength) of the X-ray fluorescence is analyzed. Generally, a wavelength dispersive X-ray fluorescence analyzer is provided with an analyzing crystal for spectrally dispersing X-ray fluorescence emitted from a sample and an X-ray detector for detecting X-rays spectrally dispersed by the analyzing crystal. These devices are accommodated in a housing.

In a wavelength dispersive X-ray fluorescence analyzer, when the temperature of the analyzing crystal fluctuates due to the influence of the environmental temperature, etc., of the external device, the analytical precision may decrease due to, e.g., fluctuations of the lattice spacing of the analyzing crystal. Therefore, it is desirable to adjust the temperature so that the temperature of the analyzing crystal does not fluctuate. For example, Japanese Unexamined Patent Application Publication No. 2015-81783 (Patent Document 1) discloses a wavelength dispersive X-ray fluorescence analyzer provided therein with a temperature regulator for maintaining the analyzing crystal at a constant temperature inside the housing. This temperature regulator is provided with a temperature sensor for detecting the temperature of the analyzing crystal and a warm air generator (a heater and a fan) for generating warm air. In this X-ray fluorescence analyzer, the temperature inside the housing can be maintained at a target temperature higher than the environmental temperature outside the housing by controlling the activation and the deactivation of the warm air generator based on the output of the temperature sensor.

PRIOR ART DOCUMENT

Patent Document

Patent Document 1: Japanese Unexamined Patent Application Publication No. 2015-81783

SUMMARY OF THE INVENTION

Problems to be Solved by the Invention

An X-ray detector may degrade the detection sensitivity due to the influence of thermal noise when it becomes a higher temperature. For this reason, in some X-ray detectors, there exists an X-ray detector recommended to be used at a temperature lower than the target temperature maintained by the temperature regulator.

However, as in the X-ray fluorescence analyzer described in Patent Document 1, in a case where a warm air generator as a temperature regulator is provided inside the housing, the temperature of the entire interior of the housing is maintained at the target temperature by the warm air generated by the warm air generator. For this reason, the temperature of the periphery of the X-ray detector reaches the target temperature, and therefore, the X-ray detector recommended to be used at a lower temperature than the target temperature cannot be used.

The present disclosure has been made to solve the above-described problems. The purpose of the present disclosure is to provide an X-ray fluorescence analyzer in which an X-ray detector recommended to be used at a temperature lower than a target temperature can be used while maintaining a temperature of an analyzing crystal at the target temperature.

Means for Solving the Problem

An X-ray fluorescence analyzer according to one aspect of this disclosure is provided with:
- an analyzing crystal configured to spectrally disperse X-ray fluorescence emitted from a sample;
- an X-ray detector configured to detect the X-ray fluorescence spectrally dispersed by the analyzing crystal;
- a warm air generator configured to generate warm air to maintain a temperature of the analyzing crystal at a target temperature; and
- a Peltier element configured to cool the X-ray detector such that a temperature of the X-ray detector is set to a temperature lower than the target temperature.

According to the above-described X-ray fluorescence analyzer, the X-ray detector can be locally cooled by the Peltier element to a temperature lower than a target temperature while maintaining the analyzing crystal at the target temperature by the warm air generated by the warm air generator. As a result, it is possible to realize an X-ray fluorescence analyzer capable of using an X-ray detector recommended to be used at a temperature lower than the target temperature while maintaining the temperature of the analyzing crystal at the target temperature.

Effects of the Invention

In this disclosure, it is possible to realize an X-ray fluorescence analyzer in which an X-ray detector recommended to be used at a temperature lower than a target temperature can be used while maintaining the temperature of the analyzing crystal at a target temperature.

EMBODIMENTS FOR CARRYING OUT THE INVENTION

Hereinafter, some embodiments of the present disclosure will be described in detail with reference to the attached drawings. In the drawings, the same or corresponding portion is denoted by the same reference symbol, and the description thereof will not be repeated.

Figure 1:
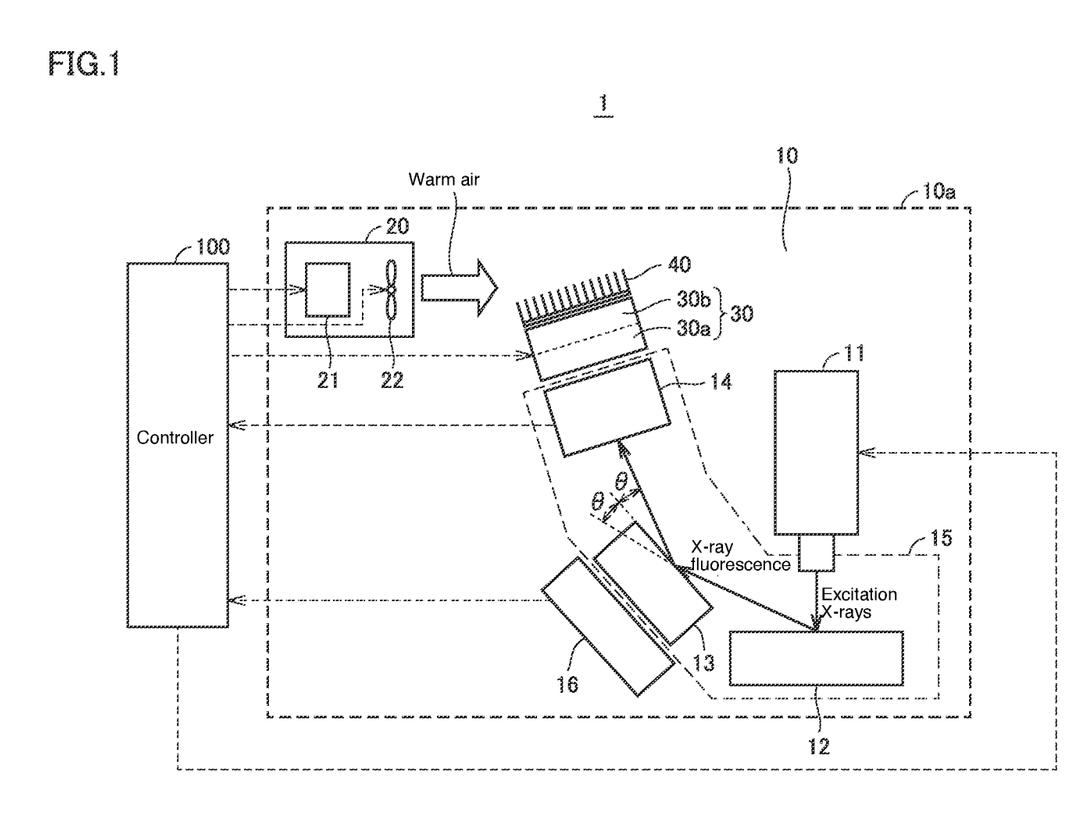
FIG. 1 is a diagram (part 1) schematically showing one example of a configuration of an X-ray fluorescence analyzer.

FIG. 1 is a diagram schematically showing one example of the configuration of a wavelength dispersive X-ray fluorescence analyzer 1 according to this embodiment.

The X-ray fluorescence analyzer 1 is a device for analyzing elements contained in a sample 12 by detecting the X-ray fluorescence emitted from the sample 12 when the sample 12 is irradiated with excitation X-rays (radiation). Note that, in this embodiment, although an X-ray fluorescence analyzer 1 of a type in which the sample 12 is irradiated with X-rays is described, it may be configured such that the sample 12 is irradiated with an electron beam in place of X-rays.

The X-ray fluorescence analyzer 1 is provided with an X-ray tube 11, an analyzing crystal 13, an X-ray detector 14, a temperature sensor 16, a warm air generator 20, a Peltier element 30, a heat sink 40, and a controller 100. The X-ray tube 11, the analyzing crystal 13, the X-ray detector 14, the temperature sensor 16, the warm air generator 20, the Peltier element 30, and the heat sink 40 are provided inside an analysis chamber 10 covered with a housing 10a. The analyzing crystal 13 and the X-ray detector 14 are further covered with a housing 15 inside the analysis chamber 10. The sample 12 is set at a predetermined position inside the housing 15 by the user.

The X-ray tube 11 is configured to emit excitation X-rays toward the sample 12 installed inside the housing 15 in response to the command from the controller 100. The sample 12 that received the excitation X-rays emits X-ray fluorescence.

The analyzing crystal 13 wavelength-disperses the X-ray fluorescence emitted from the sample 12 and diffracts the X-rays having a specified wavelength corresponding to an analysis target element toward the X-ray detector 14. The wavelength of the X-rays diffracted in the direction toward the X-ray detector 14 from the analyzing crystal 13 is determined by the angle θ formed between the X-ray fluorescence incident on the analyzing crystal 13 and the crystal lattice plane of the analyzing crystal 13. Note that when the lattice spacing of the analyzing crystal 13 is "d" and the positive integer is "n," the X-rays having a wavelength λ is spectrally dispersed in the direction of the angle 2θ satisfying the 2d·sin θ=n·λ, by the Bragg's condition. Since the X-ray fluorescence has a wavelength unique to each element, when the lattice spacing "d" of the analyzing crystal 13 is determined in advance, the spectral angle 2θ of the X-ray fluorescence spectrally dispersed with the analyzing crystal 13 becomes a value unique to each element from the Bragg's condition. By utilizing such properties, the elements contained in the sample 12 can be analyzed.

The X-ray detector 14 detects the X-rays diffracted by the analyzing crystal 13 and outputs a signal indicating the detection result to the controller 100. The X-ray detector 14 is configured by, for example, a proportional counter.

The temperature sensor 16 is arranged at a position thermally close to the housing 15 outside the housing 15, specifically at a position adjacent to the analyzing crystal 13 via the housing 15. It is desirable that the thickness of the housing 15 arranged between the temperature sensor 16 and the analyzing crystal 13 be 50 mm or less in order to appropriately detect the temperature of the analyzing crystal 13 with the temperature sensor 16. In a case where an air layer is formed between the housing 15 and the temperature sensor 16, it is desirable that the thickness of the air layer be 10 mm or less. The temperature sensor 16 detects the temperature of the housing 15 in the vicinity of the analyzing crystal 13 as the temperature of the analyzing crystal 13 and outputs the detected temperature to the controller 100.

The warm air generator 20 includes a heater 21 and a fan 22. The heater 21 is activated in response to a command from the controller 100 to generate heat. The fan 22 is activated in response to a command from the controller 100 to deliver the heat generated by the heater 21 to the inside of the analysis chamber 10. With this, the heat of the heater 21 is circulated inside the analysis chamber 10 as warm air.

The Peltier element 30 is arranged at a position thermally proximate to the X-ray detector 14 outside the housing 15, specifically at a position adjacent to the X-ray detector 14 via the housing 15. The Peltier element 30 is operated in response to a command from the controller 100 to cool the X-ray detector 14 by absorbing the heat of the housing 15 in the vicinity of the X-ray detector 14.

Specifically, the Peltier element 30 includes a heat absorption portion 30a and a heat dissipation portion 30b. The heat absorption portion 30a is in contact with the housing 15 in the vicinity of the X-ray detector 14 and absorbs the heat of the housing 15 in the vicinity of the X-ray detector 14. The heat dissipation portion 30b is provided on a side farther from the X-ray detector 14 than the heat absorption portion 30a to dissipate the heat of the heat absorption portion 30a to the outside. Heat absorption and heat dissipation occur at the heat absorption portion 30a and at the heat dissipation portion 30b, respectively, when the power is supplied to the Peltier element 30 in response to a command from the controller 100. With this, the Peltier element 30 transfers the heat from the heat absorption portion 30a to the heat dissipation portion 30b to function as a so-called heat pump.

The heat sink 40 is provided to be in contact with the heat dissipation portion 30b of the Peltier element 30. The heat sink 40 has a plurality of heat dissipation pins to release the heat of the heat dissipation portion 30b of the Peltier element 30 via the heat dissipation pins into the air in the analysis chamber 10. This facilitates the thermal transfer from the heat dissipation portion 30b of the Peltier element 30 to the air in the analysis chamber 10. Note that providing heat dissipation pins rather than providing heat radiating fins to the heat sink 40 is to reduce the air resistance to minimize the vibration caused by the contact of the warm air from the warm air generator 20.

As shown in FIG. 1, the warm air generator 20 is arranged such that the warm air sent from the warm air generator 20 is directly brought into contact with the heat sink 40. With this, the heat dissipation by the heat sink 40 is promoted. The temperature (e.g., 35° C.) of the warm air sent from the warm air generator 20 is lower than the temperature (e.g., about 50° C.) of the heat sink 40 in contact with the heat dissipation portion 30b of the Peltier element 30, and therefore, the heat dissipation by the heat sink 40 is promoted when the warm air sent from the warm air generator 20 is brought into contact with the heat sink 40.

Note that the position of the warm air generator 20 is not necessarily limited to the position shown in FIG. 1, and the warm air generator 20 may be arranged at any position within the analysis chamber 10. That is, the warm air sent from the warm air generator 20 is circulated inside the analysis chamber 10 covered with the housing 10a. Therefore, as long as the warm air generator 20 is arranged inside the analysis chamber 10, the warm air from the warm air generator 20 will come into contact with the heat sink 40.

The controller 100 includes a CPU (Central Processing Unit), a memory, an interface, etc., which are not illustrated. The controller 100 integrally controls the X-ray tube 11, the warm air generator 20, the Peltier element 30, and the X-ray detector 14. The controller 100 analyzes the elements contained in the sample 12 by acquiring the output signal from the X-ray detector 14 and determining the X-ray dose incident on the X-ray detector 14. The controller 100 can cause a display device (not shown), etc., to display the analytical result.

In the X-ray fluorescence analyzer 1 having the above-described configuration, when the temperature of the analyzing crystal 13 fluctuates due to the influence of the environmental temperature, etc., outside the analysis chamber 10, the analytical precision may deteriorate due to the fluctuation of the lattice spacing "d" or the like. Therefore, when analyzing the elements contained in the sample 12, the controller 100 performs "temperature control" that performs feedback control of the warm air generator 20 (the heater 21 and the fan 22) such that the temperature of the analyzing crystal 13 detected by the temperature sensor 16 is maintained at a target temperature (e.g., about 35° C.) higher than the environmental temperature outside the analysis chamber 10.

On the other hand, when the X-ray detector 14 becomes a high temperature, the detection sensitivity of the X-ray detector 14 may deteriorate due to the effect of thermal noise. For this reason, there exist some X-ray detectors that are recommended to be used at a temperature lower than a target temperature (e.g., about 28° C.) of the temperature control.

However, since the temperature of the entire interior of the analysis chamber 10 is maintained at a target temperature by the temperature control, the periphery of the X-ray detector 14 also becomes the target temperature, which does not allow the use of the X-ray detector 14 recommended to be used at a temperature lower than the target temperature. As the countermeasure, in a case where a water-cooled cooling device for circulating cooling water for cooling the X-ray detector 14 between the inside of the analysis chamber 10 and the outside thereof is provided, the entire structure of the X-ray fluorescence analyzer 1 becomes complicated, which may result in a significantly increased production cost.

For this reason, in the X-ray fluorescence analyzer 1 according to this embodiment, the Peltier element 30 for cooling the X-ray detector 14 is provided inside the analysis chamber 10. The Peltier element 30 can be reduced in size in comparison with the water-cooled cooling device described above and can locally cool the X-ray detector 14. Therefore, the X-ray detector 14 can be locally cooled with the Peltier element 30 to a temperature lower than the target temperature while maintaining the temperature of the analyzing crystal 13 at the target temperature by the temperature control. As a result, the X-ray fluorescence emitted from the sample 12 can be detected with high sensitivity and high accuracy by using the X-ray detector 14 that is recommended to be used at a temperature lower than the target temperature of the temperature control. Further, the Peltier element 30 can simplify the configuration as compared with a water-cooled cooling device configured to circulate cooling water between the inside of the analysis chamber 10 and the outside thereof, which can prevent a significant increase in the cost.

Furthermore, in the X-ray fluorescence analyzer 1 according to this embodiment, the heat sink 40 in contact with the heat dissipation portion 30b of the Peltier element 30 is provided. With this, it is possible to reduce the power consumption of the Peltier element 30. That is, when the Peltier element 30 is activated, the heat dissipation portion 30b of the Peltier element 30 may reach a temperature (e.g., about 50° C.) higher than the target temperature (e.g., about 35° C.). When such a condition continues, the load on the Peltier element 30 becomes higher, which may result in increased power consumption of the Peltier element 30. Therefore, in this embodiment, the heat sink 40 in contact with the heat dissipation portion 30b of the Peltier element 30 is provided to cool the heat dissipation portion 30b of the Peltier element 30 with the heat sink 40. This reduces the load on the Peltier element 30, which in turn can reduce the power consumption of the Peltier element 30.

Furthermore, in this embodiment, the warm air generator 20 is provided such that the warm air (e.g., warm air of about 35° C.) sent from the warm air generator 20 directly comes into contact with the heat sink 40 which can reach a temperature (e.g., about 50° C.) higher than the target temperature. With this, it is possible to promote the heat dissipation by the heat sink 40 by the warm air from the warm air generator 20. Therefore, it is possible to more effectively cool the heat dissipation portion 30b of the Peltier element 30. Further, with the promotion of the heat dissipation by the heat sink 40, the air in the analysis chamber 10 is quickly raised by the heat dissipation by the heat sink 40. Therefore, the operation time of the heater 21 by the temperature control is shortened, which in turn can reduce the power consumption of the heater 21. Furthermore, it is possible to utilize the heat dissipation of the Peltier element 30. Therefore, it is possible to save the power for the warm air generator 20, which can save the energy.

Furthermore, in this embodiment, the temperature sensor 16 is arranged in the vicinity of the analyzing crystal 13. The controller 100 performs the "temperature control" for performing feedback-control of the warm air generator 20 such that the temperature of the analyzing crystal 13 detected by the temperature sensor 16 is maintained at a target temperature. As a result, it is possible to appropriately suppress the thermal fluctuations of the analyzing crystal 13. That is, in a case where the temperature sensor 16 is arranged at a location away from the analyzing crystal 13, when the temperature unevenness of the inside of the analysis chamber 10 occurs due to fluctuations, etc., of the environmental temperature outside the analysis chamber 10, it is more likely to cause a deviation between the temperature detected by the temperature sensor 16 and the actual temperature of the analyzing crystal 13. As a result, it is assumed that the temperature of the analyzing crystal 13 fluctuates, thereby preventing the detection of the X-ray fluorescence with high accuracy. In contrast, in this embodiment, the temperature sensor 16 is arranged in the vicinity of the analyzing crystal 13. Therefore, even in a case where the temperature unevenness inside the analysis chamber 10 occurs, it is less likely to cause the deviation between the temperature detected by the temperature sensor 16 and the actual temperature of the analyzing crystal 13. As a result, the X-ray fluorescence can be detected with high accuracy.

Further, in this embodiment, the temperature sensor 16 is arranged at a position closer to the analyzing crystal 13 than the Peltier element 30. Therefore, it is possible to easily suppress the deviation between the temperature detected by the temperature sensor 16 and the actual temperature of the analyzing crystal 13 due to the effect of the temperature change by the Peltier element 30.

Figure 2:
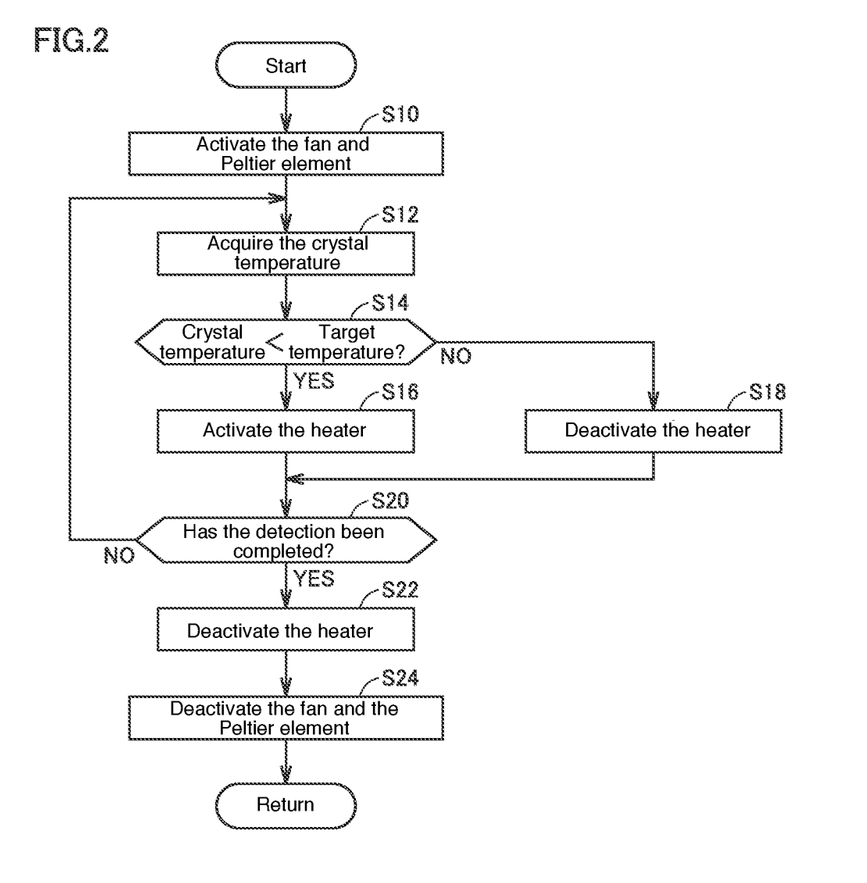
FIG. 2 is a flowchart showing one example of the processing procedures of a controller.

FIG. 2 is a flowchart showing one example of a processing procedure performed when the controller 100 performs the temperature control. This flowchart is started, for example, when the user performs a predetermined analysis-start operation in a state in which the sample 12 is arranged in the housing 15.

First, the controller 100 activates the fan 22 and the Peltier element 30 (Step S10). With this, the air sent from the fan 22 is circulated inside the analysis chamber 10, which causes the temperature unevenness inside the analysis chamber 10 to be less likely to occur and cools the X-ray detector 14 by the Peltier element 30.

Next, the controller 100 acquires the temperature of the analyzing crystal 13 detected by the temperature sensor 16 (Step S12).

Next, the controller 100 determines whether or not the temperature of the analyzing crystal 13 acquired in Step S12 is lower than a predetermined target temperature (for example, about 35° C.) (Step S14).

In a case where it is determined that the temperature of the analyzing crystal 13 is lower than the target temperature (YES in Step S14), the controller 100 activates the heater 21. Thus, the heat generated by the heater 21 is circulated inside the analysis chamber 10 as warm air from the fan 22, thereby increasing the temperature inside the analysis chamber 10. For this reason, the temperature of the analyzing crystal 13 is caused to approach the target temperature. On the other hand, in a case where the temperature of the analyzing crystal 13 is not determined to be lower than the target temperature (NO in Step S14), the controller 100 deactivates the heater 21. As a result, the temperature of the air sent from the fan 22 is lowered, thereby lowering the temperature inside the analysis chamber 10. For this reason, the temperature of the analyzing crystal 13 is brought close to the target temperature. By repeating the activation and the deactivation of the heater 21, the temperature of the analyzing crystal 13 is maintained at the target temperature.

Note that although not shown in FIG. 2, the controller 100 determines whether or not the temperature of the analyzing crystal 13 by the temperature control is stably maintained at the target temperature. At the timing when it is determined that the temperature of the analyzing crystal 13 is stably maintained at the target temperature, the controller causes the X-ray tube 11 to emit the excitation X-rays toward the sample 12 and causes the X-ray detector 14 to detect the X-ray fluorescence emitted from the sample 12 and diffracted by the analyzing crystal 13.

Thereafter, the controller 100 determines whether or not the detection of the X-ray fluorescence by the X-ray detector 14 has been completed (Step S20). When the detection of the X-ray fluorescence has not been completed (NO in Step S20), the controller 100 returns the processing to Step S12 and repeats the processing from Step S12 and the subsequent steps.

On the other hand, when the detection of the X-ray fluorescence has been completed (YES in Step S20), the controller 100 deactivates the heater 21 (Step S22) and further deactivates the fan 22 and the Peltier element 30 (Step S24).

As described above, in the X-ray fluorescence analyzer 1 according to this embodiment, the analyzing crystal 13, the X-ray detector 14, the warm air generator 20, and the Peltier element 30 are provided inside the analysis chamber 10 covered with the housing 10*a*. The analyzing crystal 13 spectrally disperses the X-ray fluorescence emitted from the sample 12. The X-ray detector 14 detects the X-ray fluorescence spectrally dispersed by the analyzing crystal 13. The warm air generator 20 generates warm air for maintaining the temperature of the analyzing crystal 13 at the target temperature. The Peltier element 30 cools the X-ray detector 14 so that the temperature of the X-ray detector 14 becomes lower than the target temperature. Therefore, the X-ray detector 14 can be locally cooled by the Peltier element 30 to a temperature lower than the target temperature while maintaining the temperature of the analyzing crystal 13 by the warm air generated with the warm air generator 20. As a result, the X-ray fluorescence emitted from the sample 12 can be detected with high sensitivity and high accuracy by using the X-ray detector 14 recommended to be used at a temperature lower than the target temperature while maintaining the temperature of the analyzing crystal 13 at the target temperature.

MODIFIED EMBODIMENTS

Modification 1

In the FIG. 1 described above, an example is shown in which the temperature sensor 16 is arranged at a position adjacent to the analyzing crystal 13 outside the housing 15, but the arrangement position of the temperature sensor 16 is not necessarily limited to the position shown in FIG. 1 as long as it is inside the analysis chamber 10. For example, the temperature sensor 16 may be arranged inside the housing 15. Further, the temperature sensor 16 may be arranged at a position away from the analyzing crystal 13.

Figure 3:
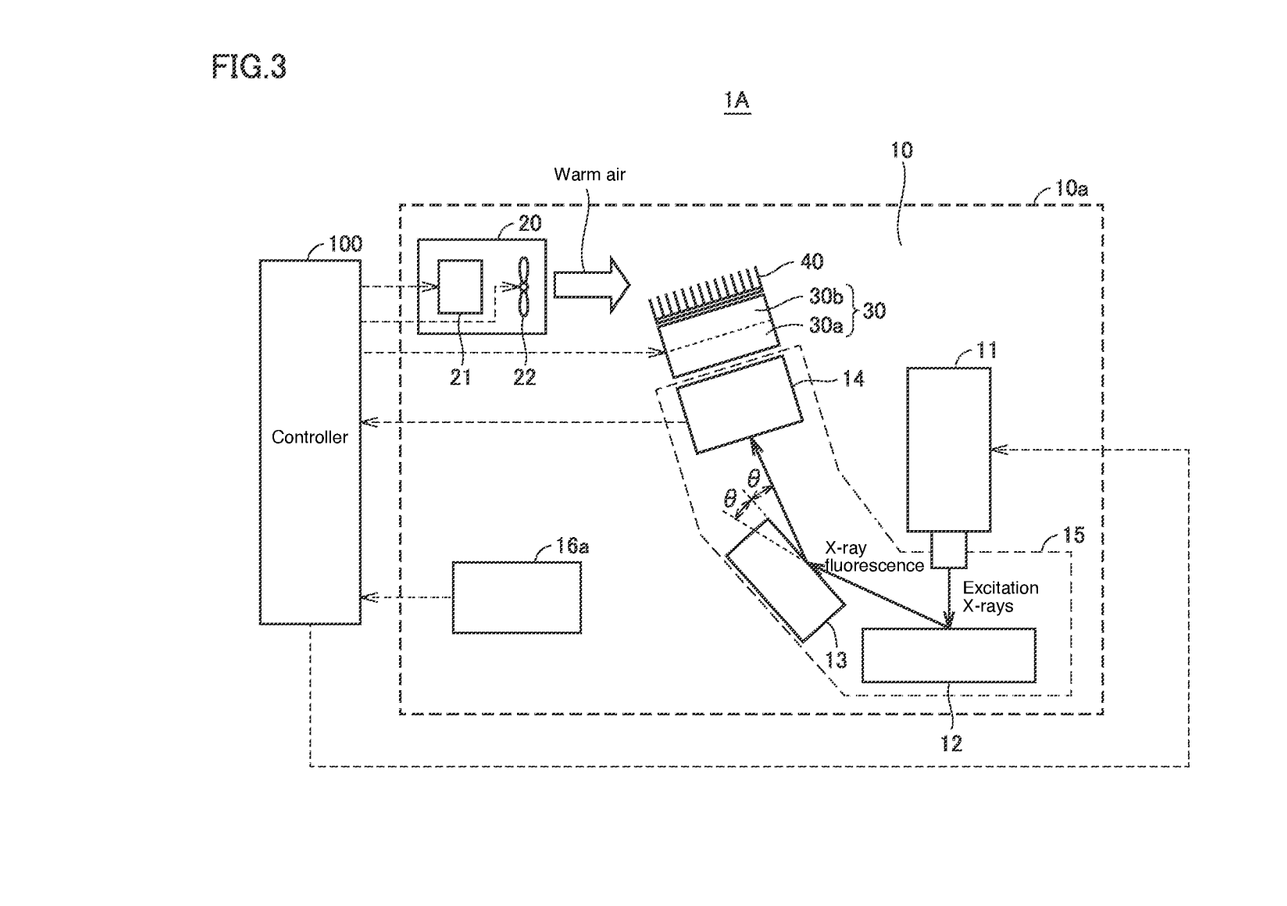
FIG. 3 is a diagram (part 2) schematically showing one example of a configuration of an X-ray fluorescence analyzer.

FIG. 3 is a diagram schematically showing one example of a configuration of an X-ray fluorescence analyzer 1A according to Modification 1. The X-ray fluorescence analyzer 1A differs from the X-ray fluorescence analyzer 1 shown in FIG. 1 in that the temperature sensor 16*a* is arranged at a position away from the analyzing crystal 13. In this X-ray fluorescence analyzer 1A, the temperature sensor 16*a* is arranged at a position away from the analyzing crystal 13. Therefore, the deviation is likely to occur between the temperature detected by the temperature sensor 16 and the actual temperature of the analyzing crystal 13. However, since the Peltier element 30 is provided to cool the X-ray detector 14, it is possible to use the X-ray detector 14 recommended to be used at a temperature lower than the target temperature.

Modification 2

In the flowchart shown in FIG. 2 described above, an example is shown in which the activation and the deactivation of the heater 21 is repeated depending on whether or not the temperature of the analyzing crystal 13 is lower than the target temperature. However, it may be configured such that hysteresis may be provided between the condition for activating the heater 21 which is not in operation and the condition for deactivating the heater 21 which is in operation to suppress the occurrence of hunting when switching. For example, it may be configured such that the heater 21 is activated when the temperature of the analyzing crystal 13 drops below a lower limit temperature lower by a predetermined value than a target temperature when the heater 21 is not in operation and the heater 21 is deactivated when the temperature of the analyzing crystal 13 has exceeded an upper limit temperature higher by the predetermined value than the target temperature when the heater 21 is in operation.

[Aspects]

It will be understood by those skilled in the art that the above-described embodiments and the modifications thereof are illustrative of the following aspects.

(Item 1)

An X-ray fluorescence analyzer is provided with:
an analyzing crystal configured to spectrally disperse X-ray fluorescence emitted from a sample;
an X-ray detector configured to detect the X-ray fluorescence spectrally dispersed by the analyzing crystal;

a warm air generator configured to generate warm air to maintain a temperature of the analyzing crystal at a target temperature; and a Peltier element configured to cool the X-ray detector such that a temperature of the X-ray detector is set to a temperature lower than the target temperature.

According to the X-ray fluorescence analyzer as recited in the above-described Item 1, it is possible to locally cool the X-ray detector with the Peltier element to a temperature lower than the target temperature while maintaining the temperature of the analyzing crystal at the constant target temperature by the warm air generated by the warm air generator. As a result, it is possible to realize an X-ray fluorescence analyzer capable of using an X-ray detector recommended to be used at a temperature lower than the target temperature while maintaining the temperature of the analyzing crystal at the target temperature.

(Item 2)

In the X-ray fluorescence analyzer as recited in the above-described Item 1, the analyzing crystal, the X-ray detector, the warm air generator, and the Peltier element are provided inside an analysis chamber covered with a housing.

According to the X-ray fluorescence analyzer described in the above-described Item 2, while maintaining the temperature of the analyzing crystal at the target temperature by circulating the warm air generated by the warm air generator inside the analysis chamber covered with the housing, it is possible to locally cool the X-ray detector with the Peltier element to a temperature lower than the target temperature.

(Item 3)

In the X-ray fluorescence analyzer as recited in the above-described Item 1 or 2, the Peltier element includes:
a heat absorption portion configured to absorb heat of the X-ray detector to cool the X-ray detector; and
a heat dissipation portion configured to dissipate heat of the heat absorption portion to an outside, the heat dissipation portion being provided on a side farther from the X-ray detector than the heat absorption portion, wherein the X-ray fluorescence analyzer further comprises a heat sink in contact with the heat dissipation portion of the Peltier element.

According to the X-ray fluorescence analyzer as recited in the above-described Item 3, it is possible to cool the heat dissipation portion of the Peltier element with the heat sink. This reduces the burden on the Peltier element, which in turn can reduce the power consumption of the Peltier element.

(Item 4)

In the X-ray fluorescence analyzer as recited in the above-described Item 3, the warm air generator is arranged such that the warm air sent from the warm air generator is brought into contact with the heat sink.

According to the X-ray fluorescence analyzer described in the above-described Item 4, it is possible to promote the heat dissipation with the heat sink by the warm air from the warm air generator. Therefore, it is possible to cool the heat dissipation portion of the Peltier element more efficiently.

(Item 5)

In the X-ray fluorescence analyzer as recited in the above-described Item 1, the X-ray fluorescence analyzer is further provided wit:

a temperature sensor arranged at a position closer to the analyzing crystal than the Peltier element; and a controller configured to control the warm air generator such that the temperature detected by the temperature sensor is maintained at the target temperature.

According to the X-ray fluorescence analyzer as recited in the above-described Item 5, since the temperature sensor is arranged at a position closer to the analyzing crystal than the Peltier element, the deviation between the temperature detected by the temperature sensor and the actual temperature of the analyzing crystal is less likely to occur. As a result, the actual temperature of the analyzing crystal can be maintained at the target temperature with high accuracy, and therefore, the X-ray fluorescence can be detected with high accuracy.

The embodiments disclosed herein are to be considered in all respects as illustrative and not restrictive. The scope of the present invention is indicated by claims rather than by the embodiments described above, and is intended to include all modifications within the meanings and ranges equivalent to the claims.

DESCRIPTION OF SYMBOLS 1, 1A: X-ray fluorescence analyzer
10: Analysis chamber
10a, 15: Housing
11: X-ray tube
12: Sample
13: Analyzing crystal
14: X-ray detector
16: Temperature sensor
20: Warm air generator
21: Heater
22: Fan
30: Peltier element
30a: Heat absorption portion
30b: Heat dissipation portion
40: Heat sink
100: Controller

The invention claimed is:

1. An X-ray fluorescence analyzer comprising:
an analyzing crystal configured to spectrally disperse X-ray fluorescence emitted from a sample;
an X-ray detector configured to detect the X-ray fluorescence spectrally dispersed by the analyzing crystal;
a warm air generator configured to generate warm air to maintain a temperature of the analyzing crystal at a target temperature; and
a Peltier element configured to cool the X-ray detector such that a temperature of the X-ray detector is set to a temperature lower than the target temperature,
wherein the Peltier element includes:
a heat absorption portion configured to absorb heat of the X-ray detector to cool the X-ray detector; and
a heat dissipation portion configured to dissipate heat of the heat absorption portion to an outside, the heat dissipation portion being provided on a side farther from the X-ray detector than the heat absorption portion,
wherein the X-ray fluorescence analyzer further comprises a heat sink in contact with the heat dissipation portion of the Peltier element, and
wherein the warm air generator is arranged such that the warm air sent from the warm air generator is brought into contact with the heat sink.

2. The X-ray fluorescence analyzer as recited in claim 1, wherein the analyzing crystal, the X-ray detector, the warm air generator, and the Peltier element are provided inside an analysis chamber covered with a housing.

3. The X-ray fluorescence analyzer as recited in claim 1, further comprising:
   a temperature sensor arranged at a position closer to the analyzing crystal than the Peltier element; and
   a controller configured to control the warm air generator such that the temperature detected by the temperature sensor is maintained at the target temperature.

* * * * *